United States Patent
Tsuzuki et al.

(10) Patent No.: US 6,230,489 B1
(45) Date of Patent: May 15, 2001

(54) EMISSION CONTROL DEVICE FOR INTERNAL COMBUSTION ENGINE

(75) Inventors: Mikio Tsuzuki, Kawasaki; Kimiyoshi Nishizawa, Yokohama; Ritsuo Sato, Yokohama; Naoki Kachi, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/323,698

(22) Filed: Jun. 1, 1999

(30) Foreign Application Priority Data

Jun. 1, 1998 (JP) .................................................. 10-151410
Apr. 5, 1999 (JP) .................................................. 11-097523

(51) Int. Cl.$^7$ ...................................................... F01N 3/10
(52) U.S. Cl. .............................. 60/299; 60/297; 60/301; 422/171; 422/177
(58) Field of Search .......................... 60/299, 301, 297, 60/284; 422/169, 170, 171, 177

(56) References Cited

U.S. PATENT DOCUMENTS

| | | | | |
|---|---|---|---|---|
| 4,253,992 | * | 3/1981 | Soejima et al. | 252/477 R |
| 5,125,231 | * | 6/1992 | Patil et al. | 60/274 |
| 5,538,697 | * | 7/1996 | Abe et al. | 422/171 |
| 5,795,840 | * | 8/1998 | Takami et al. | 502/327 |
| 6,029,441 | * | 2/2000 | Mizuno et al. | 60/274 |
| 6,047,544 | * | 4/2000 | Yamamoto et al. | 60/285 |

FOREIGN PATENT DOCUMENTS 8-224449   9/1996   (JP) .

* cited by examiner

Primary Examiner—Thomas Denion
Assistant Examiner—Binh Tran
(74) Attorney, Agent, or Firm—Foley & Lardner

(57) ABSTRACT

A plurality of catalysts (7), (9) are disposed in an engine exhaust passage (13). At least the catalyst disposed downstream of these catalysts comprises a multi-layered catalyst (7) which is covered in a catalyst layer (24a) on the surface and an HC absorbent layer (24b) on an inner layer with respect to a catalyst carrier (23). A ratio of the downstream multi-layered catalyst (7) (catalyst heat capacity/catalyst surface area) is set so that it is greater than the same ratio for the upstream catalyst (9). In this way, temperature increase in the upstream catalyst (9) is advanced, the temperature gradient in the downstream catalyst (7) is increased and temperature rises in the HC absorbent layer are reduced. As a result, the HC emission period approximates the activation period of the catalyst layer (24a). In this way, during low temperature vehicle operation, it is possible to synchronize the timing of HC emission by the HC absorbent layer and catalyst activation and therefore to achieve extreme reductions in HC emitted to the outside atmosphere.

14 Claims, 3 Drawing Sheets

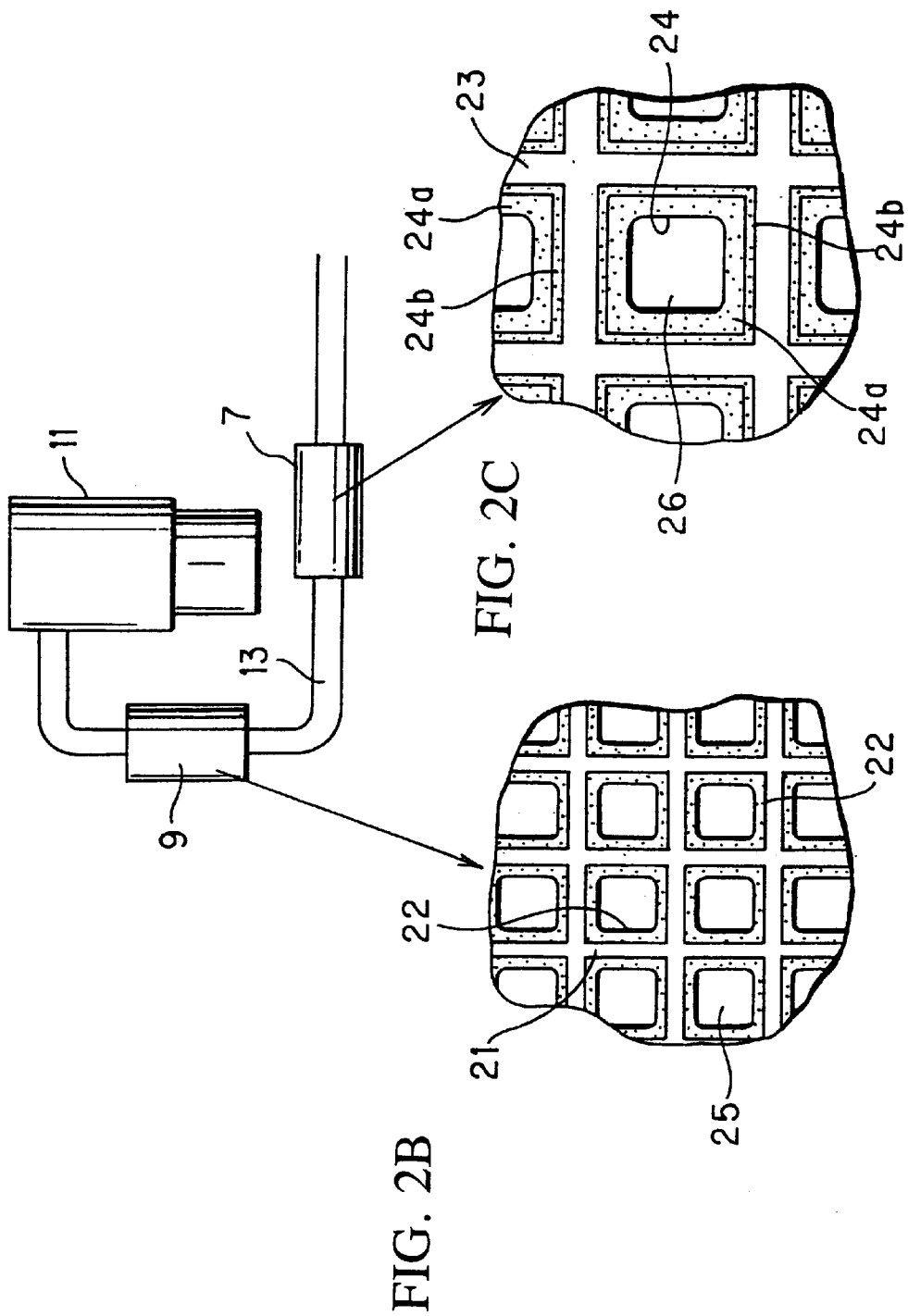

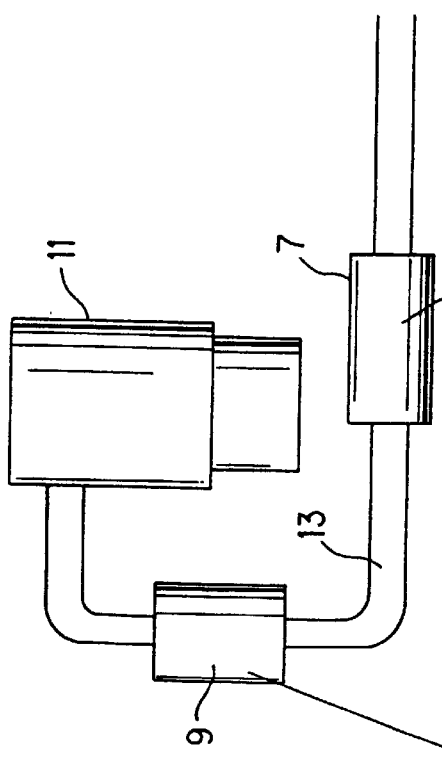
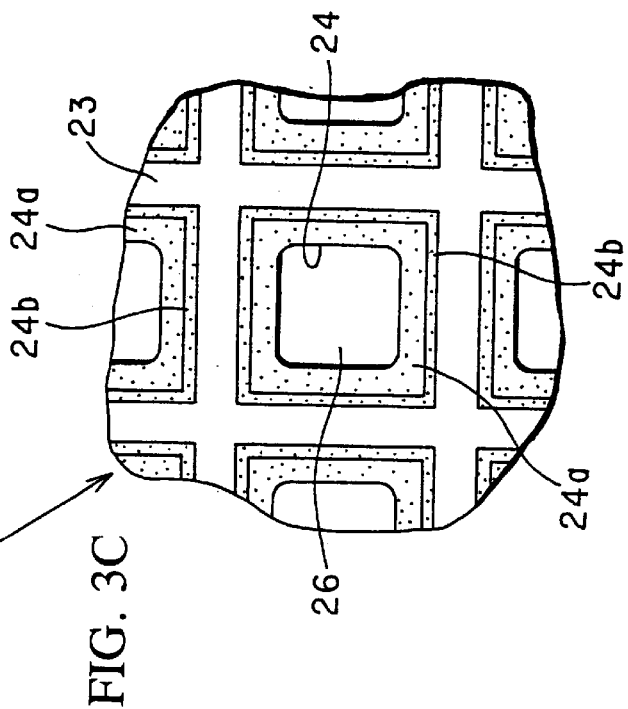
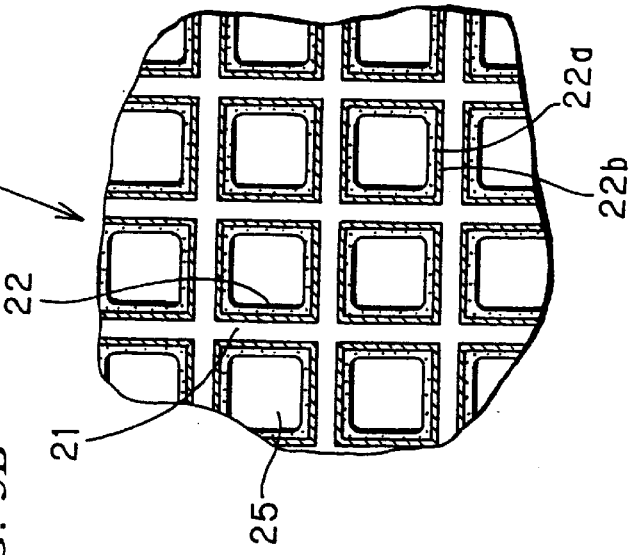
FIG. 3A
FIG. 3B
FIG. 3C

EMISSION CONTROL DEVICE FOR INTERNAL COMBUSTION ENGINE

FIELD OF THE INVENTION

The present invention relates to an emission control device for an internal combustion engine and in particular a device which removes toxic components from exhaust gas by a catalyst which has a hydrocarbon (hereafter HC) absorbent layer.

BACKGROUND OF THE INVENTION

Devices are well known in the art which control exhaust emissions by the oxidization of HC and CO and reduction of $NO_x$ components present in exhaust gas emitted from an internal combustion engine by use of a catalyst. However emission control performance is relatively low when a catalyst is not sufficiently activated as, for example, in a low temperature gas environment produced immediately after cold-starting an engine.

Attempts have been made to absorb HC components from low temperature exhaust gas emissions by using an HC absorbent material which absorbs HC from the exhaust gases thus preventing such components from being emitted into the atmosphere. However such HC absorbent materials release bound HC when the temperature exceeds a certain level and thus can only be used in a low temperature exhaust gas environment. Furthermore the temperature at which HC release is initiated is generally lower than the activation temperature of the catalyst and so when the temperature of the exhaust gas exceeds the temperature at which HC release is initiated but is lower than the activation temperature of the catalyst, HC is released into the atmosphere.

Tokkai-Hei-8-224449 discloses a catalyst converter which comprises a lower layer comprised an HC absorbent material and an upper layer formed from a catalyst which are formed on a honeycomb-shaped catalyst carrier. In this way, HC permeating the catalyst layer at low temperatures is absorbed by the HC absorbent material on the lower layer. When such bound HC is released from the HC absorbent material due to rises in temperature, the HC is oxidized by the action of the catalyst when passing through the upper catalyst layer.

However even in this case, the HC absorbent material releases bound HC at temperatures lower than the catalyst activation temperature for example at 150–200° C. As a result, if the catalyst is not activated, released HC is not oxidized and unavoidably released directly into the atmosphere.

SUMMARY OF THE INVENTION

The present invention is proposed to solve the above-mentioned problems and has the object of synchronizing as closely as possible, at low operating temperatures, the period at which HC begins to be released from the HC absorbent material with the period at which the catalyst is activated and thus radically minimize emission of HC into the atmosphere.

In order to achieve above the objects the present invention provides an emission control device for an internal combustion engine.

The emission control device comprises an upstream catalyst disposed in an exhaust passage of said engine, a downstream catalytic converter disposed downstream of the upstream catalytic converter, which contains a multi-layered catalyst, the surface of a catalyst carrier of the multi-layered catalyst being covered with an outer catalyst layer and an underlying HC absorbent layer, a catalyst temperature control mechanism is provided which establishes a large temperature gradient between the surface catalyst layer and the inner underlying HC absorbent layer;and The details as well as other features and advantages of the invention are set forth in the remainder of the specification and are shown in the accompanying drawings.

BRIEF DESCRIPTION OF THE DRAWINGS

FIGS. 2A, 2B and 2C are respectively a schematic view showing the engine and catalytic converters, and enlarged partial cross-sectional views according to a first embodiment of the invention.

FIGS. 3A, 3B and 3C are respectively a schematic view showing the engine and catalytic converters, and enlarged partial cross-sectional views according to another embodiment of the invention.

DESCRIPTION OF THE PREFERRED EMBODIMENTS

Figure 1:
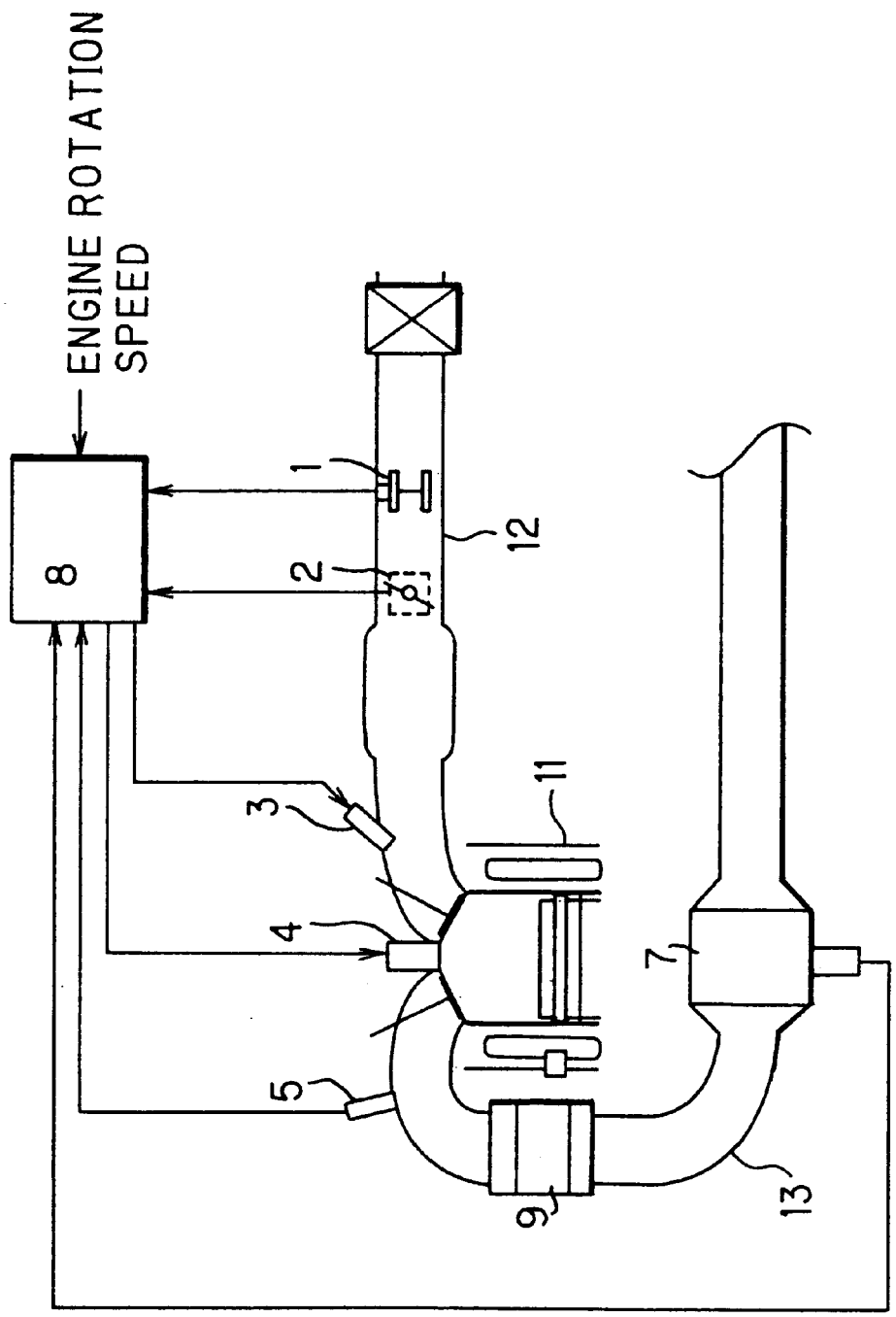
FIG. 1 is an overall schematic view showing an embodiment of the present invention.

The preferred embodiments of the invention are explained below with reference to the accompanying drawings.

FIG. 1 shows the overall layout of the device. A throttle valve 2 is disposed downstream in the air-intake 12 of an engine 11. A fuel injection valve 3 which injects fuel is provided in the engine 11. A three-way catalytic converter 9 is provided upstream in the exhaust passage 13 which reduces $NO_x$ and oxidizes HC and CO components in the exhaust gas.

A multi-layer catalytic converter 7 which comprises a three-way catalyst which has an HC absorbent function is disposed further downstream. As explained below, during low temperatures at which the catalyst is not activated, HC present in exhaust gas is bound. When temperatures rise thereafter, reduction and oxidization of exhaust gas is performed which includes the oxidization of HC released from the catalyst.

The air-fuel ratio of the exhaust gas is controlled by a controller 8 to an air-fuel ratio required by each catalytic converter 7, 9 above, that is to say, to a stoichiometric air-fuel ratio. In that regard, the following signals are input into the controller 8, namely an air intake amount signal from an air intake amount sensor 1 disposed in the air intake passage 12, a throttle aperture signal from the throttle valve 2, an exhaust gas air-fuel ratio signal from an air-fuel ratio (oxygen concentration) sensor 5 which is disposed in the exhaust gas passage 13, and an engine rotation speed signal.

A fuel injection amount is calculated on the basis of these signals so as to equal a stoichiometric air-fuel ratio and an injection amount signal is output to the fuel injection valve 3 in synchronization with the engine rotations.

The air-fuel ratio of the engine is feedback controlled during normal running to equal a stoichiometric ratio. However depending on certain operating conditions such as cold-starting the engine, open control is performed to set the air-fuel ratio to a richer ratio than a stoichiometric ratio.

Lastly an optimal ignition signal is output from the controller 8 to an ignition plug 4 depending on the operating conditions.

FIG. 2 is an enlarged cross section of each catalyst. The three-way upstream catalytic converter houses 9 a catalyst carrier 21 which is formed from a honeycomb-shaped body on which cross sections of the exhaust gas passage are displaced in series in a grill shape. The surface of the carrier 21 is covered with a catalyst layer 22 which is formed from a catalyst. Exhaust gas flows from the upstream to the downstream of the passage 25 through the grill. At this time, the exhaust gas comes into contact with the catalyst layer 22 with the result that HC and CO are oxidized and $NO_x$ components are reduced.

Within the downstream multi-layered catalytic converter 7, a catalyst carrier 23 is similarly disposed in series in the grill, the surface of the catalyst carrier 23 has an interior passage 26 and is covered with a catalyst • HC absorbent layer 24. The surface layer comprises a catalyst layer 24a of a fixed thickness. The lower (inner) layer comprises an HC absorbent layer 24b which is formed from an HC absorbent material.

Each layer is formed in a porous shape having a plurality of microscopic holes. HC exhaust gas components are absorbed on the HC absorbent layer 24b by permeating the catalyst layer 24a when the catalyst temperature is low.

As is clear from the drawings, the catalyst carrier 23 of the downstream multi-layered catalyst 7 has a low cell number (grill opening concentration) and a high board width in comparison with the carrier 21 of the upstream three-way catalytic converter 9. The surface area of the catalyst carrier 23 which partitions the exhaust gas passage is also small in comparison with the catalyst carrier 21 of the upstream catalytic converter 9.

More precisely, the catalyst carrier 21 for the upstream three-way catalyst 9 is a ceramic honeycomb-shaped catalytic converter carrier having a board thickness of 65 μm and a cell concentration of 900/square inch. The catalyst carrier 23 for the downstream multi-layered catalytic converter 7 is a ceramic honeycomb-shaped catalyst carrier having a board thickness of 270 μm and a cell concentration of 200/square inch. Using a metal honeycomb-shaped catalyst carrier as a catalyst carrier for the downstream multi-layered catalytic converter 7 which has a heat capacity per unit area which is approximately 2.6 times that of ceramic enables the use of a carrier with a cell concentration of 200/square inch and a thickness of 50 μm.

Furthermore the thickness of the catalyst layer 24a of the multi-layer catalytic converter 7 is thicker in comparison with the catalyst layer 22 of the three-way catalytic converter 9. Preferably the thickness of the catalyst layer 24a is more than three times the thickness of the catalyst layer 22.

In other words, the ratio Rc of the catalyst heat capacity to the catalyst surface area, that is to say [catalyst heat capacity]/[catalyst surface area]=Rc, is adapted to be greater in the downstream multi-layer catalytic converter 7 than in the upstream three-way catalytic converter 9 . In this way, a catalyst temperature control mechanism is composed which increases the temperature gradient of the surface and inner layers in the catalyst cross section of the downstream multi-layer catalyst 7.

The operation of the invention will be discussed below.

The exhaust gas flows to the downstream multi-layered catalytic converter 7 after passing the upstream three-way catalytic converter. The temperature of the exhaust gas in the upstream section is originally higher than the downstream section. Thus there is a tendency for temperature to rise to that degree. Moreover the Rc ratio of [catalyst heat capacity]/[catalyst surface area] of the upstream three-way catalytic converter 9 is small. That is to say, since the heat absorbing surface area is large with respect to the unit heat capacity and the catalyst temperature rises quickly, the upstream three-way catalytic converter 9 quickly reaches an activation temperature after the engine is started.

In contrast, since the downstream multi-layered catalytic converter 7 has a larger Rc ratio of [catalyst heat capacity]/[catalyst surface area] than the upstream side and the catalyst surface area which contacts with the exhaust gas is relatively small with respect to the unit catalyst heat capacity, the catalyst temperature does not rise quickly. Furthermore since the exhaust gas temperature further downstream is also relatively low, temperature rise in the downstream multi-layer catalytic converter 7 displays a tendency to be slower than the upstream catalyst.

When exhaust gas temperature is low immediately after engine starting and the upstream three-way catalytic converter 9 is not activated, HC exhaust gas components reach the downstream multi-layered catalytic converter 7 without being oxidized by the upstream three-way catalytic converter 9. HC components permeate the surface catalyst layer 24a on the downstream catalyst and are absorbed by the HC absorbent layer 24b on the inner layer.

As temperature in the exhaust system rises after engine activation, even though the upstream three-way catalyic converter 9 approaches an activation temperature, the temperature of the downstream multi-layered catalytic converter 7 remains relatively low. Therefore the temperature of the HC absorbent layer 24b is enabled to successfully absorb HC components in the period until a temperature is reached at which absorbed HC begins to be released for example 150–200° C.

The Rc ratio of [catalyst heat capacity]/[catalyst surface area] is larger in the downstream multi-layered catalytic converter 7. Precisely, there is a large temperature gradient between the deep HC absorbent layer 24b and the surface catalyst layer 24a since the thickness of the catalyst layer 24a on the surface side for example is large in comparison with the upstream catalyst. That is to say, the temperature of the HC absorbent layer 24b is low in comparison with the surface temperature of the catalyst layer 24a and the temperature difference is large.

The temperature range at which the HC absorbent layer 24b begins emitting HC is lower than the temperature range at which the catalyst layer 24a is activated. Therefore, since the temperature gradient is steep, when a temperature is reached at which the inner HC absorbent layer 24b begins to emit HC, or before that time, the temperature of the catalyst layer 24a can reach an activation temperature.

During the period after engine activation while the temperature of the exhaust gas system is rising, the catalyst layer 24a of the multi-layered catalytic converter 7 approaches an activation temperature. At this time, the temperature of the HC absorbent layer 24b also rises. However since the temperature gradient is large, the HC emission initiation period approximates the catalyst activation period.

Thus even if absorbed HC is emitted from the absorbent layer 24b, such HC will be oxidized while passing through the already activated catalyst layer 24a on the surface and HC emission to the atmosphere will be prevented.

When the temperature of the upstream and downstream catalysts exceeds an activation temperature, HC components are oxidized by the catalyst and HC emission can be prevented even without the HC absorbent action of the HC absorbent layer 24b.

Since the Rc ratio [catalyst heat capacity]/[catalyst surface area] of the upstream three-way catalytic converter 9 is small, early activation is possible due to rapid rises in temperature. As a result, the temperature increase of the downstream multi-layered catalytic converter 7 is advanced to the degree to which the temperature of the exhaust gas is raised due to the heat of reaction.

Thus since the temperature of the catalyst system as a whole is rapidly raised, sufficient exhaust gas emission control performance is displayed within short periods after engine activation.

To construct a catalyst temperature control mechanism which increases the temperature gradient of the downstream multi-layered catalytic converter 7, the present invention is adapted to increase the Rc ratio [catalyst heat capacity]/[catalyst surface area] in the downstream multi-layered catalytic converter 7 more than the upstream three-way catalytic converter 9. However it is possible to achieve the same effect even if the invention is arranged as disclosed below.

That is to say, the downstream multi-layered catalytic converter 7, in comparison with the upstream three-way catalytic converter 9 may:

(1) increase the relative catalyst heat capacity by increasing the thickness of the catalyst layer.
(2) reduce the relative passage surface area by reducing the cell number of openings on the catalyst carrier.
(3) reduce the relative surface area and increase the relative heat capacity by increasing the thickness of the catalyst carrier.
(4) use a metal with a higher heat capacity than the upstream ceramic to manufacture the catalyst carrier.

The above elements may be used independently or in combination.

Now with respect to the embodiment of the present invention as shown in FIG. 3, an HC absorbent layer 22b comprising an HC absorbent material is provided on the inner side of the catalyst layer 22a so that the updtream three-way catalyst 9 is identical to the downstream multi-layered catalyst 7.

Thus, in the upstream three-way catalyst 9, HC will be absorbed by the HC absorbent layer 22b and HC emitted due to rises in temperature will be oxidized by the catalyst layer 22a on the surface. However, even if a portion of the HC components flow downstream without being oxidized, such HC components will be absorbed by the downstream multi-layered catalytic converter 7 which has a lower temperature than the upstream section. Thus, as HC components are released as the temperature of the downstream multi-layered catalytic converter 7 rises to equal that upstream, they are processed by the surface catalyst layer 24a.

In this way, HC emission to the outer atmosphere is reduced by the application of a two-stage emission control process due to two catalysts.

The contents of Japanese Patent Application P10-151410 (filed Jun. 1, 1998) and P11-97523 (filed Apr. 5, 1999) on which the disclosure and claim priority are based, are hereby incorporated herein by reference. Although the invention has been described above by reference to certain embodiments of the invention, the invention is not limited to the embodiments described above. Modifications and variations of the embodiments described above will occur to those skilled in the art, in light of the above teaching.

The scope of the invention is defined with reference to the following claims.

What is claimed is:

1. An emission control device for an internal combustion engine comprising:
    an upstream catalytic converter disposed in an exhaust passage of said engine, a surface of a catalyst carrier disposed in said upstream catalytic converter being covered with a catalyst layer; and
    a downstream catalytic converter disposed downstream of said upstream catalytic converter, said downstream catalytic converter including a multi-layered catalyst wherein an outer surface of a catalyst carrier of said multi-layered catalyst is coated with a HC absorbent layer and then covered with an overlaying catalyst layer, and wherein a thickness of the catalyst layer of the multi-layered catalyst is thicker than a thickness of the catalyst layer on the catalyst carrier in said upstream catalytic converter.

2. An emission control device for an internal combustion engine according to claim 1, wherein the catalyst layer of said multi-layered catalyst is more than three times thicker than that of the catalyst layer in said upstream catalytic converter.

3. An emission control device for an internal combustion engine according to claim 1, wherein the catalyst in said upstream catalytic converter contains a three-way catalyst.

4. An emission control device for an internal combustion engine according to claim 1, wherein the catalyst in said upstream catalytic converter is a multi-layered catalyst having an HC absorbent layer which is covered with a layer of catalyst.

5. An emission control device for an internal combustion engine wherein comprising:
    an upstream catalytic converter disposed in an exhaust passage of said engine, said upstream catalytic converter including a first honeycomb-shaped catalyst carrier which is covered with a catalyst layer;
    a downstream catalytic converter disposed in the exhaust passage downstream of said upstream catalytic converter, said downstream catalytic converter including a multi-layered catalyst which is carried on a second honey-comb shaped catalyst carrier in manner wherein an HC absorbent layer is formed on a surface of the second honeycomb-shaped catalyst carrier and is covered with catalyst layer which overlays the HC absorbent layer, and wherein a cell concentration of the second honeycomb-shaped catalyst carrier for said downstream multi-layered catalyst is smaller than a cell concentration of the second honey-comb catalyst carrier of said upstream catalytic converter.

6. An emission control device for an internal combustion engine according to claim 5, wherein the cell concentration of the second honeycomb-shaped catalyst carrier is less than ½ that of the cell concentration of the first catalyst carrier.

7. An emission control device for an internal combustion engine according to claim 6, wherein the cell concentration of said catalyst carrier in said upstream catalytic converter is greater than 500 per square inch.

8. An emission control device for an internal combustion engine according to claim 7, wherein the cell concentration of said catalyst carrier in said downstream catalytic converter is greater than 250 per square inch.

9. An emission control device for an internal combustion engine according to claim 5, wherein the cell concentration of said catalyst carrier in said upstream catalytic converter is greater than 500 per square inch.

10. An emission control device for an internal combustion engine according to claim 9, wherein the cell concentration of said catalyst carrier in said downstream catalytic converter is greater than 250 per square inch.

11. An emission control device for an internal combustion engine comprising:
    an upstream catalytic converter disposed in an exhaust passage of said engine, a surface of a first catalyst carrier of said upstream catalytic converter being covered with a catalyst layer;

a downstream catalytic converter disposed in the exhaust passage downstream of said upstream catalytic converter, said downstream catalytic converter having a second catalyst carrier on which a multi-layered catalyst is carried in a manner wherein an HC absorbent layer is formed on the surface of the second catalyst carrier and is covered with a catalyst layer which overlies the HC absorbent layer; and wherein a thickness of the second catalyst carrier of said downstream multi-layered catalyst is greater than a thickness of the first catalyst carrier for an upstream catalyst.

12. An emission control device for an internal combustion engine according to claim 11 wherein:

the first catalyst carrier comprises a ceramic honeycomb-shaped catalyst carrier with a thickness of less than 90 m; and the second catalyst carrier comprises a ceramic honeycomb-shaped catalyst carrier with a thickness of greater than 150 m.

13. An emission control device for an internal combustion engine according to claim 11 wherein the first catalyst carrier comprises a ceramic honeycomb-shaped catalyst carrier and the second catalyst carrier comprises a metal honeycomb-shaped catalyst carrier.

14. An emission control device for an internal combustion engine according to claim 13 wherein:

a thickness of the ceramic honeycomb-shaped catalyst carrier is less than 90 m; and a thickness of metal honeycomb-shaped catalyst carrier is more than 40 m.

* * * * *